US011908197B2

(12) United States Patent
Sato

(10) Patent No.: US 11,908,197 B2
(45) Date of Patent: Feb. 20, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shunsuke Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 17/370,974

(22) Filed: Jul. 8, 2021

(65) Prior Publication Data
US 2022/0019811 A1 Jan. 20, 2022

(30) Foreign Application Priority Data
Jul. 20, 2020 (JP) .................................. 2020-123795

(51) Int. Cl.
| *G06V 20/52* | (2022.01) |
| *G06V 10/25* | (2022.01) |
| *G06V 40/20* | (2022.01) |
| *G06V 40/10* | (2022.01) |

(52) U.S. Cl.
CPC .............. *G06V 20/53* (2022.01); *G06V 10/25* (2022.01); *G06V 40/103* (2022.01); *G06V 40/23* (2022.01)

(58) Field of Classification Search
CPC ...... G06V 20/53; G06V 10/25; G06V 40/103; G06V 40/23
See application file for complete search history.

(56) References Cited

U.S. PATENT DOCUMENTS

| 2001/0017933 A1* | 8/2001 | Chujoh ..................... G08G 1/04 382/104 |
| 2016/0321507 A1* | 11/2016 | Yang ....................... G06V 40/20 |
| 2019/0012547 A1* | 1/2019 | Togashi .................... H04N 7/18 |
| 2020/0050872 A1* | 2/2020 | Ikeda ..................... G06V 40/10 |

FOREIGN PATENT DOCUMENTS

| GB | 2556578 A * | 5/2018 | ............. B61L 25/02 |
| JP | 5992681 B2 | 9/2016 | |
| WO | WO-2017086058 A1 * | 5/2017 | ......... G06K 9/00778 |
| WO | WO-2018163804 A1 * | 9/2018 | ......... G06K 9/00778 |
| WO | 2018025831 A1 | 6/2019 | |

OTHER PUBLICATIONS

Chen, Tsong-Yi, Chao-Ho Chen, Da-Jinn Wang, and Yi-Li Kuo. "A people counting system based on face-detection." In 2010 Fourth International Conference on Genetic and Evolutionary Computing, pp. 699-702. IEEE, 2010. (Year: 2010).*

Chen, Thou-Ho, Tsong-Yi Chen, and Zhi-Xian Chen. "An intelligent people-flow counting method for passing through a gate." In 2006 IEEE Conference on Robotics, Automation and Mechatronics, pp. 1-6. IEEE, 2006. (Year: 2006).*

* cited by examiner

*Primary Examiner* — Carol Wang
(74) *Attorney, Agent, or Firm* — Canon U.S.A., Inc. IP Division

(57) ABSTRACT

An information processing apparatus that detects an object from an image, includes a determination unit configured to determine a boundary at which a movement of the object between partial regions in the image is estimated, the partial regions each including a plurality of objects, and an estimation unit configured to estimate movement information indicating a number of objects that have passed the boundary determined by the determination unit.

19 Claims, 17 Drawing Sheets

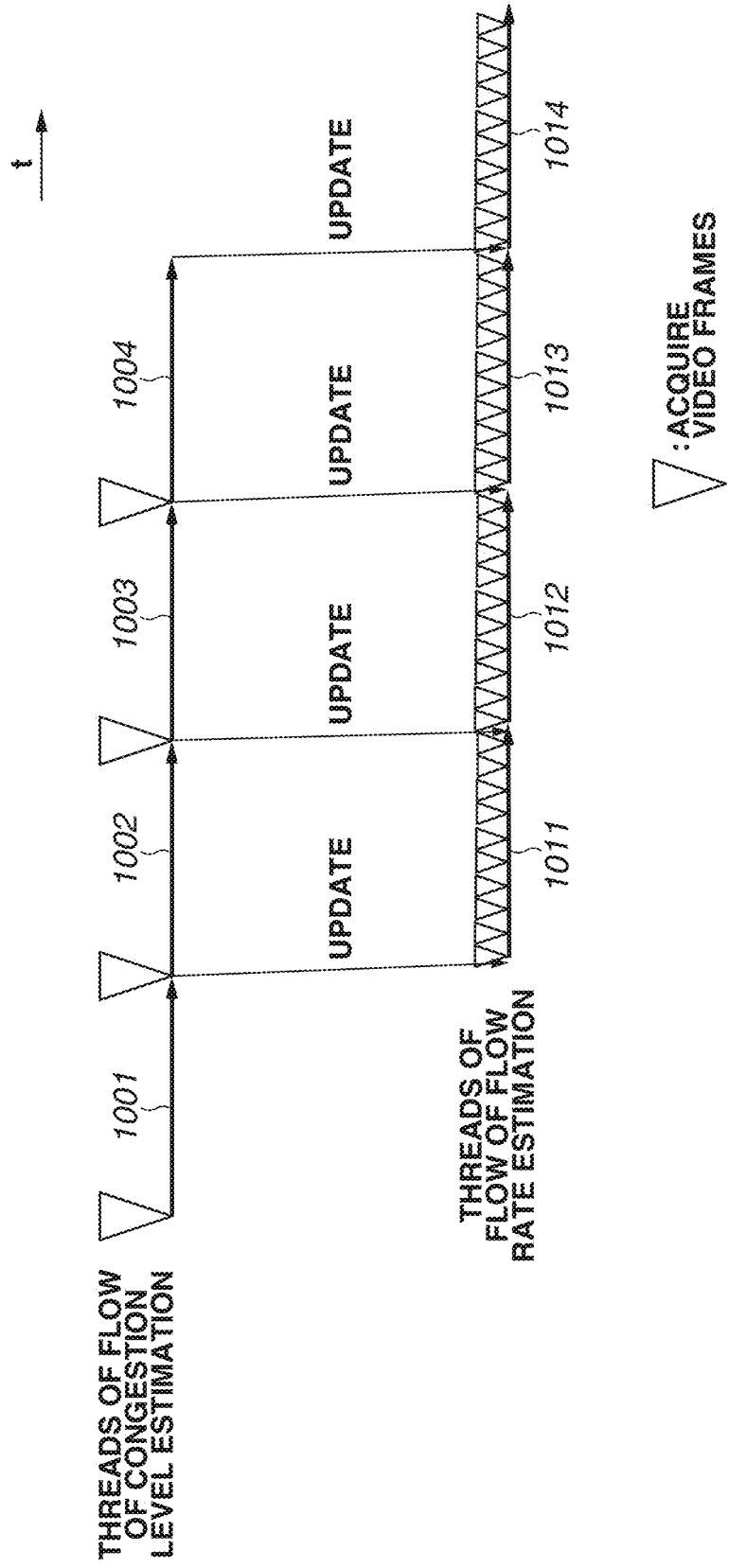

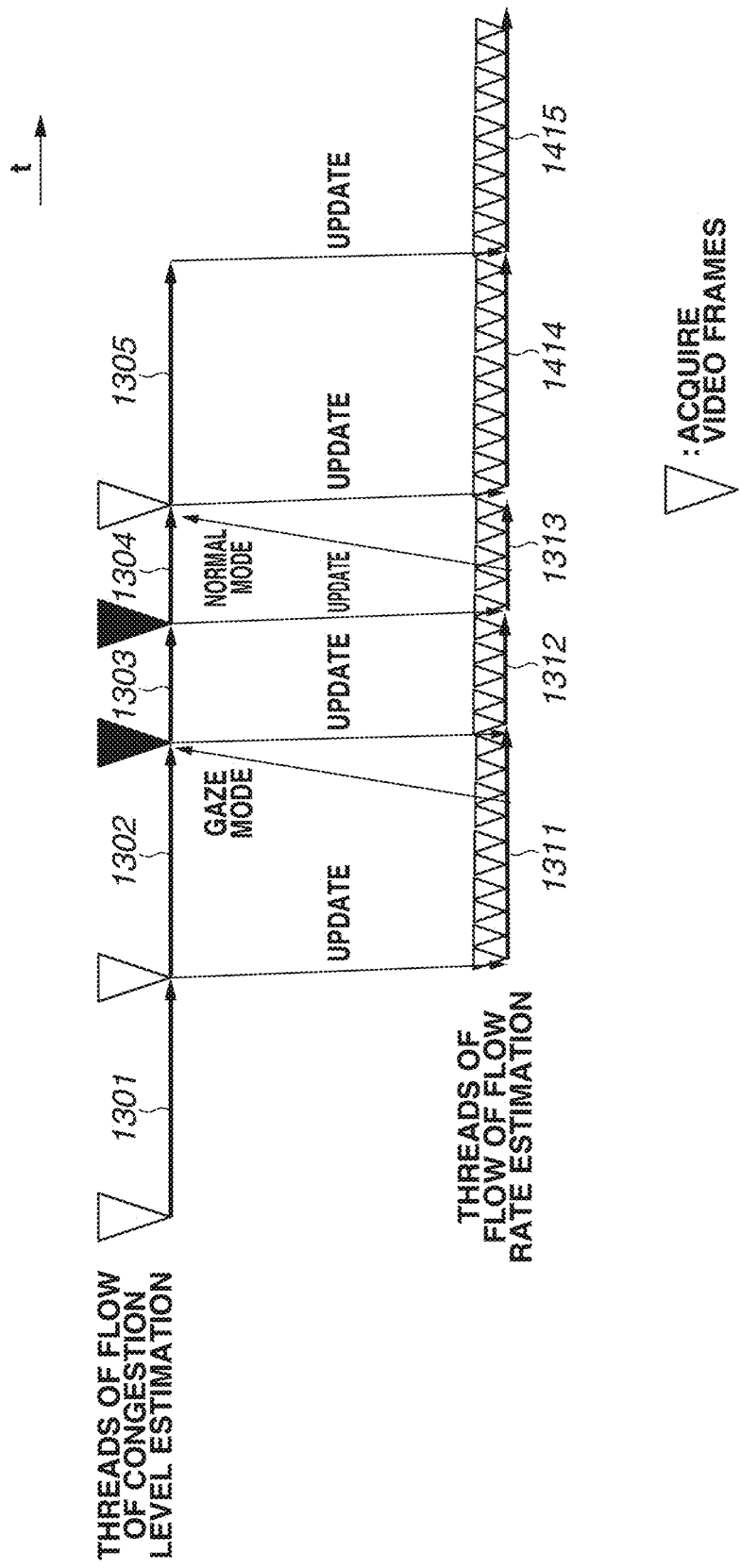

INFORMATION PROCESSING APPARATUS, INFORMATION PROCESSING METHOD, AND STORAGE MEDIUM

BACKGROUND

Field of the Disclosure

The present disclosure relates to a technique for estimating movements of objects from an image.

Description of the Related Art

In a recent technique for video processing, there is a method for estimating a flow rate from a video obtained by capturing images of a crowd of people, and monitoring a congestion situation at a site where the images are being captured. Japanese Patent No. 5992681 discusses a technique of dividing the entire image into a plurality of partitions, estimating a flow rate by performing statistic processing on each partition, and judging whether a congestion state has occurred. In addition, WO2018/025831 discusses a technique of focusing on a partial region in a video and estimating a flow rate of people moving from the partial region using the number of people, orientations of people, and a motion amount of people in the region.

The technique according to Japanese Patent No. 5992681 involves performing statistical processing on the entire image, and thus can detect abnormality that has occurred in a monitoring region, but imposes a high processing load. In contrast, according to the technique of WO2018/025831, setting a partial region of interest fixes a site at which flow rate estimation is performed. Hence, the technique enables detection of congestion in the partial region, but fails to detect congestion that may possibly occur in other regions. Accordingly, there is a possibility that a user fails to detect a region where an abnormal congestion state is likely to occur, from among regions other than a set region.

SUMMARY

The present disclosure has been made in view of the above issues, and is directed to a technique for detecting a region where a congestion state is expected to occur on a priority basis.

According to an aspect of the present disclosure, an information processing apparatus that detects an object from an image, includes a determination unit configured to determine a boundary at which a movement of the object between partial regions in the image is estimated, the partial regions each including a plurality of objects, and an estimation unit configured to estimate movement information indicating a number of objects that have passed the boundary determined by the determination unit.

Further features of the present disclosure will become apparent from the following description of exemplary embodiments with reference to the attached drawings.

BRIEF DESCRIPTION OF THE DRAWINGS

FIG. 10 is a diagram illustrating a processing timing.

FIG. 13 is a diagram illustrating a processing timing.

DESCRIPTION OF THE EMBODIMENTS

An exemplary embodiment of the present disclosure will be described with reference to the accompanying drawings. The exemplary embodiment described below does not limit the scope of the claimed disclosure, and all combinations of features described in the following exemplary embodiment are not necessarily essential to the configuration of the present disclosure.

Figure 1:
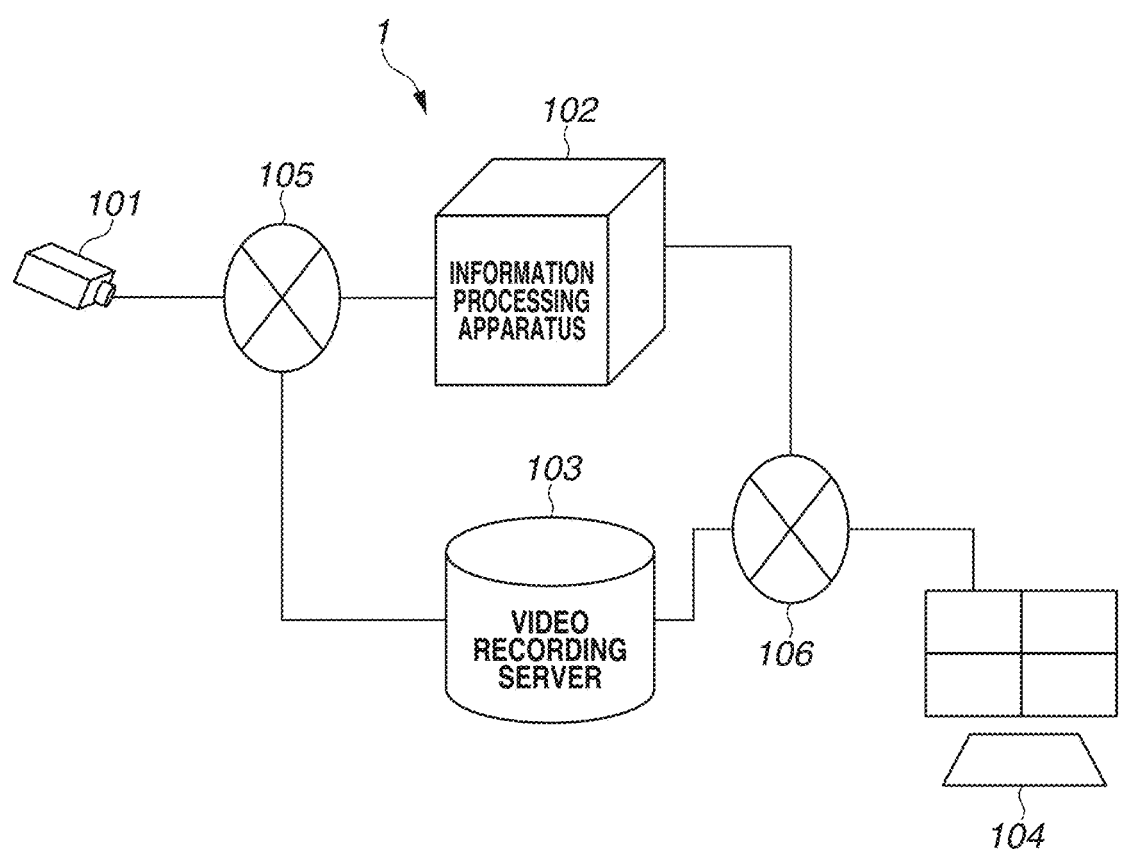
FIG. 1 is a diagram illustrating a configuration example of an information processing system.

A description will be given of a configuration example of an information processing system according to a first exemplary embodiment with reference to FIG. 1. An information processing system 1 includes a camera 101, an information processing apparatus 102, a video recording server 103, and an information terminal 104. At least one or more cameras, that is, cameras 101 to 101n, are connected. A camera network 105 is a network that connects n cameras (cameras 101 to 101n). At least one or more client apparatuses, that is, information terminals 104 to 104n, are connected. A client network 106 is a network that connects the client apparatuses (information terminals 104 to 104n). In the present exemplary embodiment, a description will be given of an example of a case where a monitoring camera is installed to monitor a public space, the flow rate of objects and the number of objects from are estimated from images and occurrence of an abnormal congestion state is notified. In this example, assume that an object as a monitoring target (detection target) is a human. Specifically, in a case where a snatcher, a random attacker, or the like appears, congestion may occur at a site where congestion is not expected to occur from its normal state of affairs. Congestion can occur also in a case where somebody falls over or an unexpected event occurs. In a case where congestion occurs in this way, it is important for a user as a surveillant to dash off to the scene as quickly as possible as a first action. Hence, required are not only everyday experiences and findings, but also a technique for discovering an unforeseeable event early by utilizing analysis of the flow of people in real time. Additionally, in a case of performing wide-range monitoring, processing for estimating the number of people on the entire video imposes a high processing load and processing of detecting an abnormal congestion state takes time. Thus, there is a possibility that real-time characteristics of the monitoring become impaired. Given these circumstances, a description will be given of a method of performing the flow rate estimation on a partial region where a congestion state is likely to occur out of the entire monitoring region, and thereby detecting the congestion state at speed close to real time while reducing a processing load.

The camera (imaging apparatus) 101 is an imaging apparatus including an image sensor, lenses, motors that drive the image sensor and the lenses, a microprocessing unit (MPU) or the like that controls the image sensor and the lenses. The camera 101 captures a video and converts the video into electronic data. The camera 101 is installed at a site where monitoring is required by a user, and transmits a captured video via the camera network 105. In the present exemplary embodiment, assume that the camera 101 is a monocular color camera, and a captured image is a color image. However, the camera 101 may be a monochrome camera besides the color camera. For example, the camera 101 may be a grayscale camera, an infrared camera, a wide-angle lens camera, or a panoramic camera. The camera 101 may be a camera capable of performing pan/tilt/zoom operations.

The information processing apparatus 102 is a calculator, and analyzes a video transmitted from the camera 101 or a video stored in the video recording server 103. In the present exemplary embodiment, the information processing apparatus 102 performs video analysis processing to estimate the number of objects in an image serving as a processing target, based on, for example, image features of the objects. Specifically, the information processing apparatus 102 performs object detection (object detection), number detection (object detection), flow rate estimation, and abnormality detection (congestion detection). Furthermore, the information processing apparatus 102 tabulates estimation results, and outputs notification for a user to a predetermined output apparatus in accordance with a preset condition. The information processing apparatus 102 may perform, for example, recognition processing such as face authentication, human figure tracking, invasion detection, human figure attribute detection, weather detection, and traffic congestion detection as well. The description is given here of a specific example in which a detection (monitoring) target is a human, the number of people (i.e., a population density) in a region is estimated (extraction of the region of interest), and the flow rate of a crowd is estimated (human flow rate estimation and crowd analysis). The detection target may be other than a human, and the present exemplary embodiment can set, for example, a vehicle, a living thing, a component, and a ball, as the detection target.

The video recording server (storage apparatus) 103 stores a video acquired from the camera 101 in a storage included in the video recording server 103. The video recording server 103 transmits the stored video to the information processing apparatus 102, the information terminal (output apparatus) 104, or the like, upon request therefrom. The video recording server 103 also stores metadata indicating a result of analysis of the information processing apparatus 102 as well. The storage includes a storage medium such as a hard disk, an MPU, and the like. A storage on a network such as a network-attached storage (NAS), a storage area network (SAN), and a cloud service may be used in substitution for the storage medium.

The information terminal (output apparatus) 104 is an information processing apparatus including a display (display unit). Specifically, the information terminal 104 is a tablet terminal or a personal computer (PC). The information terminal 104 outputs a live video captured by the camera 101. In addition, the information terminal 104 outputs a past video stored in the video recording server 103. Furthermore, the information terminal 104 can output various kinds of analysis results from the information processing apparatus 102 in a format that is easily recognized by a user. With this configuration, the user can check the video and the various kinds of analysis results using the information terminal 104. In a case where abnormality is detected, the information processing apparatus 102 gives notification about the abnormality to the information terminal 104 to notify the user of the abnormality. The information terminal 104 may output audio using voice or predetermined alarm sound, in addition to display output on a display.

The camera 101, the information processing apparatus 102, and the video recording server 103 are connected by the camera network 105. The information processing apparatus 102, the video recording server 103, and the information terminal (output apparatus) 104 are connected by the client network 106. The camera network 105 and the client network 106 are configured by, for example, a local area network (LAN).

While the camera 101, the information processing apparatus 102, the video recording server 103, and the information terminal (output apparatus) 104 are assumed to be different computer apparatuses in the present exemplary embodiment, the present disclosure is not limited to such a configuration. For example, the information processing apparatus 102 and the video recording server 103 may be implemented as applications in one server or a virtual server. In addition, functions of the information terminal (output apparatus) 104 may be implemented in the information processing apparatus 102 and the video recording server 103, or functions of the information processing apparatus 102 and the video recording server 103 may be installed in the camera 101. Alternatively, each of the information processing apparatus 102 and the video recording server 103 may be a server cluster including a plurality of server apparatuses, and may be configured to perform analysis by distributed computing. Furthermore, each of the information processing apparatus 102 and the video recording server 103 may be provided as a virtual instance on a cloud service or a service by a Representational State Transfer (REST) application programming interface (API). In such cases, the Internet or a virtual private network (VPN) may be used as the camera network 105 or the client network 106.

Figure 2:
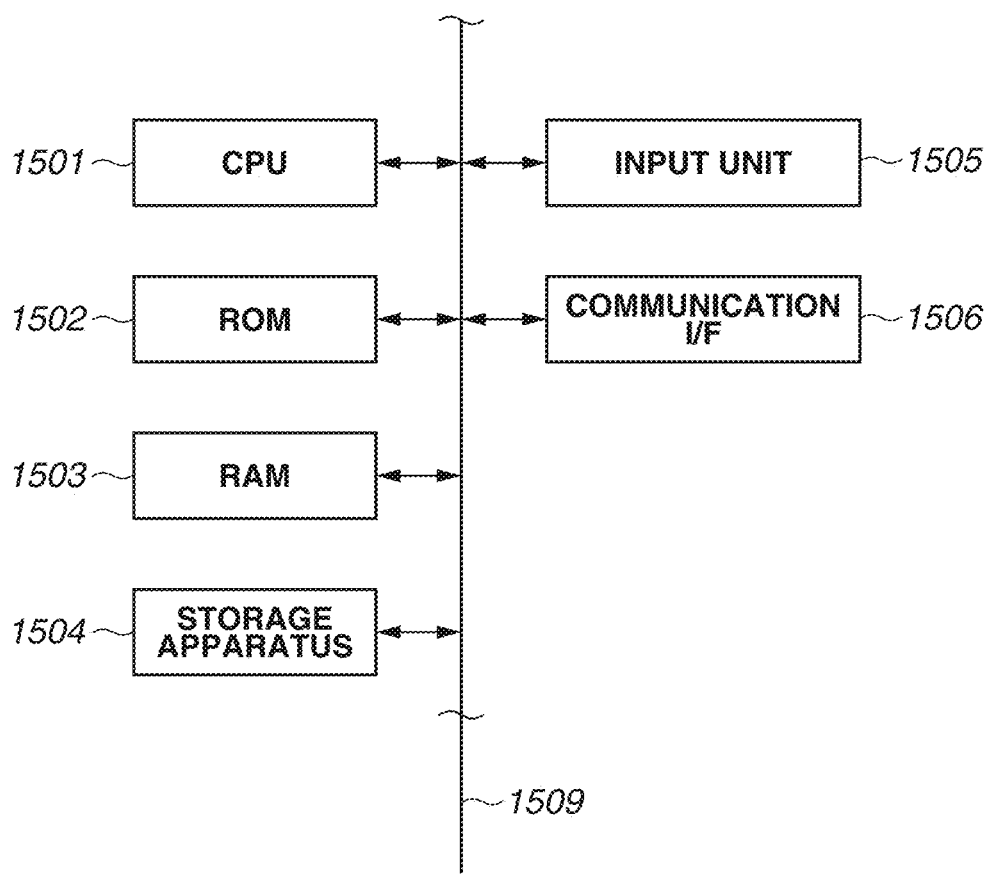
FIG. 2 is a diagram illustrating a hardware configuration example of an information processing apparatus.

FIG. 2 is a diagram illustrating a hardware configuration example of the information processing apparatus. A central processing unit (CPU) 1501 reads out and executes an operating system (OS) or other programs stored in a read-only memory (ROM) 1502 or a storage apparatus 1504 using a random-access memory (RAM) 1503 as a work memory. The CPU 1501 controls each constituent element connected to a system bus 1509 to perform computing and logical judgement of various kinds of processing. The processing executed by the CPU 1501 includes information processing according to the present exemplary embodiment. The storage apparatus 1504 is a hard disk drive, an external storage apparatus, or the like, and stores therein programs or various kinds of data used in information processing according to the present exemplary embodiment. The storage apparatus 1504 corresponds to the video recording server 103 illustrated in FIG. 1. An input unit 1505 is an imaging apparatus such as a camera, and an input device to which a user's instruction is input, such as buttons, a keyboard, and a touch panel. The storage apparatus 1504 is connected to the system bus 1509, for example, via an interface such as a Serial Advanced Technology Attachment (SATA), and the input unit 1505 is connected to the system bus 1509, for example, via a serial bus such as a Universal Serial Bus (USB), but detailed descriptions thereof are omitted. A communication interface (I/F) 1506 communicates with an external apparatus by wireless communication.

Figure 3:
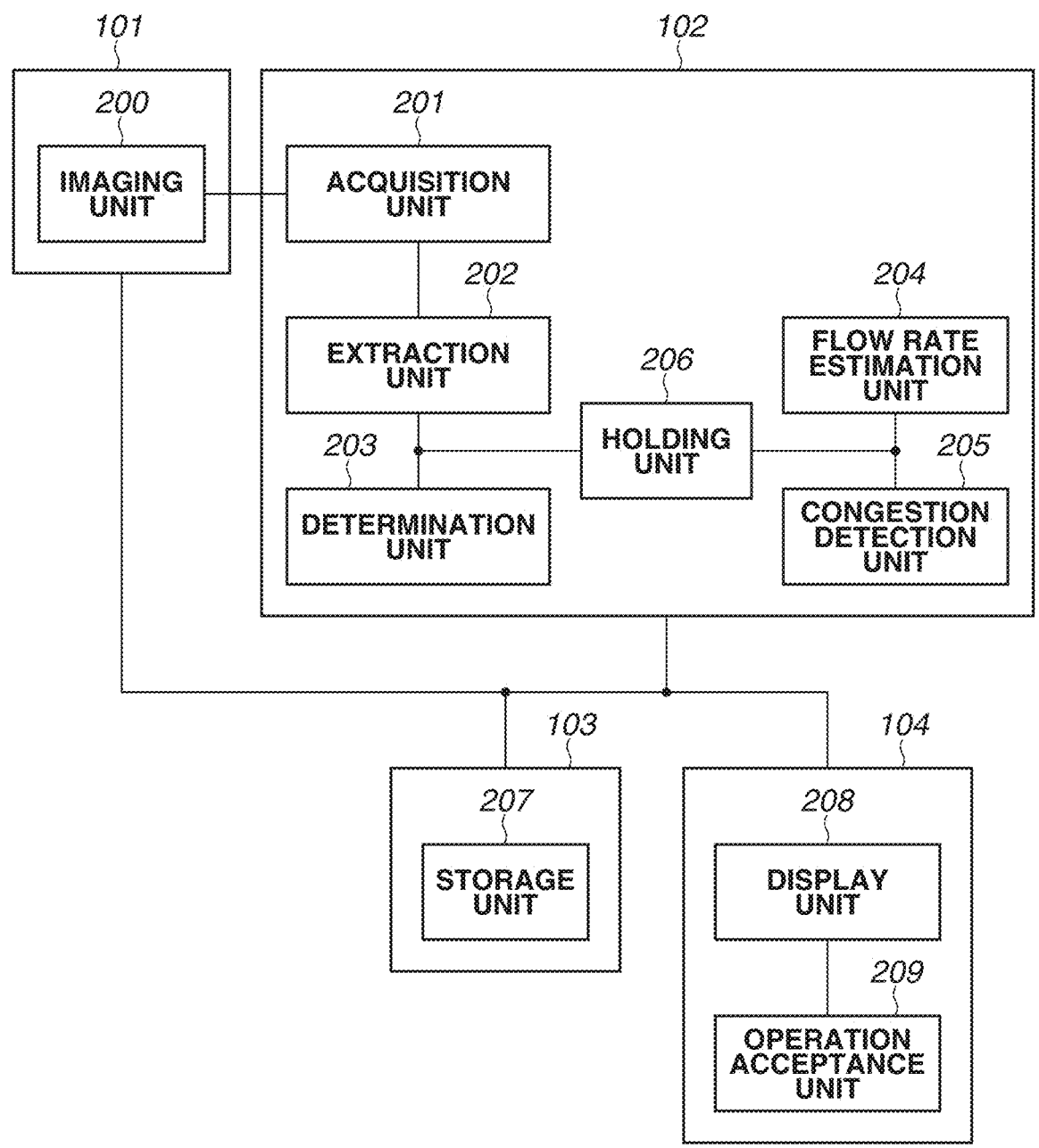
FIG. 3 is a block diagram illustrating a functional configuration example of the image processing apparatus.

FIG. 3 is a functional block diagram illustrating a functional configuration example of the information processing apparatus according to the present exemplary embodiment. The information processing apparatus 102 includes an acquisition unit 201, an extraction unit 202, a determination unit 203, a flow rate estimation unit 204, a congestion detection unit 205, and a holding unit 206. The information processing apparatus 102 is connected to several external apparatuses. Specifically, the information processing apparatus 102 is connected to the imaging apparatus 101 including an imaging unit 200, the video recording server (storage apparatus) 103 including a storage unit 207, and the information terminal (output apparatus) 104 including a display unit 208 and an operation acceptance unit 209. The information processing apparatus 102 may include a functional configuration of an external apparatus of the information processing apparatus 102. Alternatively, a plurality of external apparatuses each having an identical functional configuration may be connected to the information processing apparatus 102. For example, two or more imaging apparatuses may be connected to the information processing apparatus 102.

Specifically, the imaging apparatus 101 is an imaging apparatus such as a camera, and captures an image of a predetermined region. The imaging apparatus 101 corresponds to the camera 101 illustrated in FIG. 1. The imaging unit 200 includes an image sensor and an optical system such as lenses. The imaging apparatus 101 captures a video, converts the video to a stream of electronic image data, and transmits the stream of electronic image data to the information processing apparatus 102 and the video recording server 103.

The acquisition unit 201 acquires an image captured by the imaging apparatus 101. In the present exemplary embodiment, the description will be given assuming that a live video captured by the imaging apparatus 101 is an analysis target to detect occurrence of abnormal congestion almost in real time. In a case of analyzing a past video, the acquisition unit 201 may acquire an image from the video recording server 103.

The extraction unit 202 extracts a region of interest including objects, the number of which is larger than a predetermined threshold, based on a distribution of objects detected from an image. Details of processing of extracting the region of interest will be described below. The extraction unit 202 is composed of an MPU and the like. The region of interest to be extracted indicates a region that is crowded with people to some extent (within the same angle of view) like an area on the left side illustrated in FIG. 6A and that includes more people than other regions, instead of a situation where abnormal congestion is in place at a point in time when the region of interest is extracted. Estimating the flow (flow rate) of people from the region crowded with people to some extent enables effective prediction of occurrence of abnormal congestion. The target object extracted from a video is a human body in the present exemplary embodiment, and the position of a human figure in an image is detected based on the shape of the head. A plurality of objects (human bodies) may also be referred to as a crowd of people in the following description.

Based on the position of the region of interest extracted by the extraction unit 202, the determination unit 203 determines the position at which the flow rate of objects is to be estimated. In this processing, assuming that a region in proximity to a region that is not yet abnormally congested but is crowded with people to some extent is a region having a possibility of developing into abnormal congestion in the future, the determination unit 203 sets the region as a target position of the flow rate estimation. The determination unit 203 is composed of an MPU and the like. A method of determination will be described below.

The flow rate estimation unit 204 estimates the flow rate of objects at the determined position. The description here is given assuming that the motion of a plurality of objects (crowd of people) is the flow rate. A method of estimating the flow rate from a video will be described in detail in a subsequent section. The flow rate estimation unit 204 tracks people in proximity to the target position of the flow rate estimation and counts the number of people who have crossed a detection line set at the target position to estimate the flow rate.

The congestion detection unit 205 detects whether there is, in proximity to the region of interest, a region that includes objects, the number of which is equal to or larger than a threshold, based on the estimated flow rate of the objects at the determined position. The congestion detection unit 205 is composed of an MPU and the like, and detects whether a density of objects (a density of population) in the region of interest is higher than a preset threshold based on the estimated flow rate (the number of objects that have crossed the line) and the number of objects in the region in proximity to the region of interest. A detection method will be described below.

The holding unit 206 is composed of an MPU and the like, and stores therein a result of processing performed by the extraction unit 202 and a result of processing performed by the determination unit 203. That is, the holding unit 206 holds a result of estimating a congestion level and a result of determining an estimation position, and performs synchronized storage and access control to appropriately pass over the held results to the flow rate estimation unit 204 and the congestion detection unit 205. The storage unit 207 corresponds to the video recording server 103 illustrated in FIG.

1. The storage unit 207 includes a storage medium such as a hard disk, an MPU, and the like, and stores therein a video captured by the imaging unit 200. The storage unit 207 also stores therein metadata such as information that associates the video with the result of estimating the congestion level and the result of determining the estimation position, and a creation time. The display unit 208 and the operation acceptance unit 209 are included in the information terminal (output apparatus) 104 illustrated in FIG. 1.

The display unit 208 includes a liquid crystal screen and an MPU that controls the liquid crystal screen, presents information to a user, and creates and displays a user interface (UI) screen on which an operation is performed.

The operation acceptance unit 209 includes switches and a touch panel, and senses an operation by a user to input the operation to the information processing apparatus 102. Another pointing device such as a mouse and a tracking ball may be used in substitution for a touch panel. The display unit 208 may be included in the information processing apparatus 102.

Figure 4A:
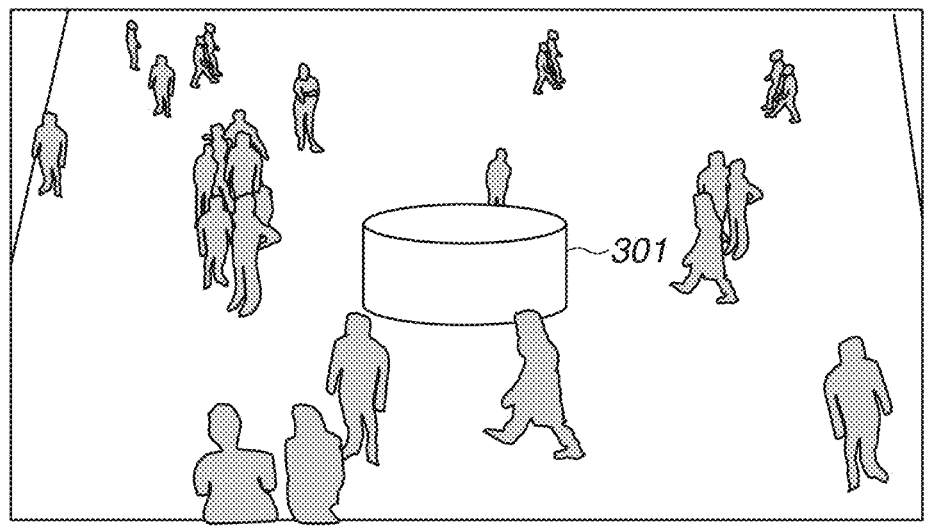
FIG. 4A is a diagram illustrating an example of an image as a processing target.
Figure 4B:
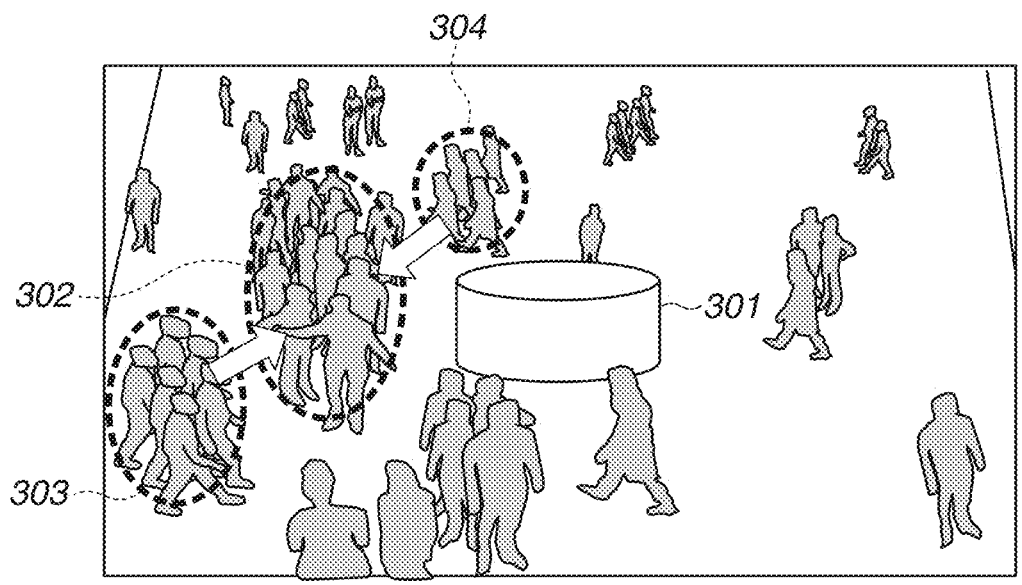
FIG. 4B is a diagram illustrating an example of an image as a processing target.

Subsequently, an overview and effects of processing of the information processing apparatus according to the present exemplary embodiment will be described below with reference to FIGS. 4A and 4B. FIGS. 4A and 4B are diagrams each illustrating an example of a video captured by the imaging unit 200. The imaging unit 200 captures an image of a site where a large unspecified number of human figures gather like a public open space from a high viewpoint. An object 301, such as a flowerbed, is arranged at the center of the video. The camera of the imaging unit 200 captures an image in high resolution such as 4K resolution, and is installed to be capable of monitoring a range as wide as possible by capturing an image with a wider angle of view. To capture a high-resolution image for wide-range monitoring, processing of detecting human figures or processing of estimating the flow rate on the entire image imposes a high processing load. Hence, it is effective to perform the processing especially on a region that is desired to be monitored on a priority basis in order to speed up the processing and reduce a load.

FIG. 4A illustrates an example of a situation at normal times. FIG. 4B illustrates an example of a phenomenon that is desired to be detected in the present exemplary embodiment, that is, a situation where abnormal congestion is likely to occur. At a point in time in FIG. 4B, there is a group of crowded people in a region 302, and a congestion level is high there. Further, groups 303 and 304 are moving to the region 302 at the point in time in FIG. 4B, and are considered to head for a position of the region 302. That is, in the region 302, more people are expected to appear, and a congestion level is expected to be extremely high. In the present exemplary embodiment, the information processing apparatus 102 detects such a phenomenon, and then notifies a user of occurrence of abnormal congestion. This configuration allows a security officer or the like to promptly dash off to the region where abnormal congestion is expected to occur. The motion of each of the groups 303 and 304 is detected as the flow rate of people flowing into the region 302. The information processing apparatus 102 can detect the occurrence of abnormal congestion in the region 302 in the near future, together with information about the number of people and the congestion level in the region 302. Assume that the abnormal congestion state is a state in which the number of people in a region is larger than a predetermined threshold. In this manner, the information processing apparatus 102 prioritizes the region including a relatively large number of people as a target for flow rate analysis, and can thereby effectively provide information important for a user while stabilizing processing of a calculator. In the present exemplary embodiment, the information processing apparatus 102 executes the object detection with respect to the entire video at a low frequency, and executes the flow rate estimation in real time after restricting an estimation position. With this configuration, the information processing apparatus 102 can detect a region where congestion is likely to occur on a priority basis while reducing a processing load.

Figure 5:
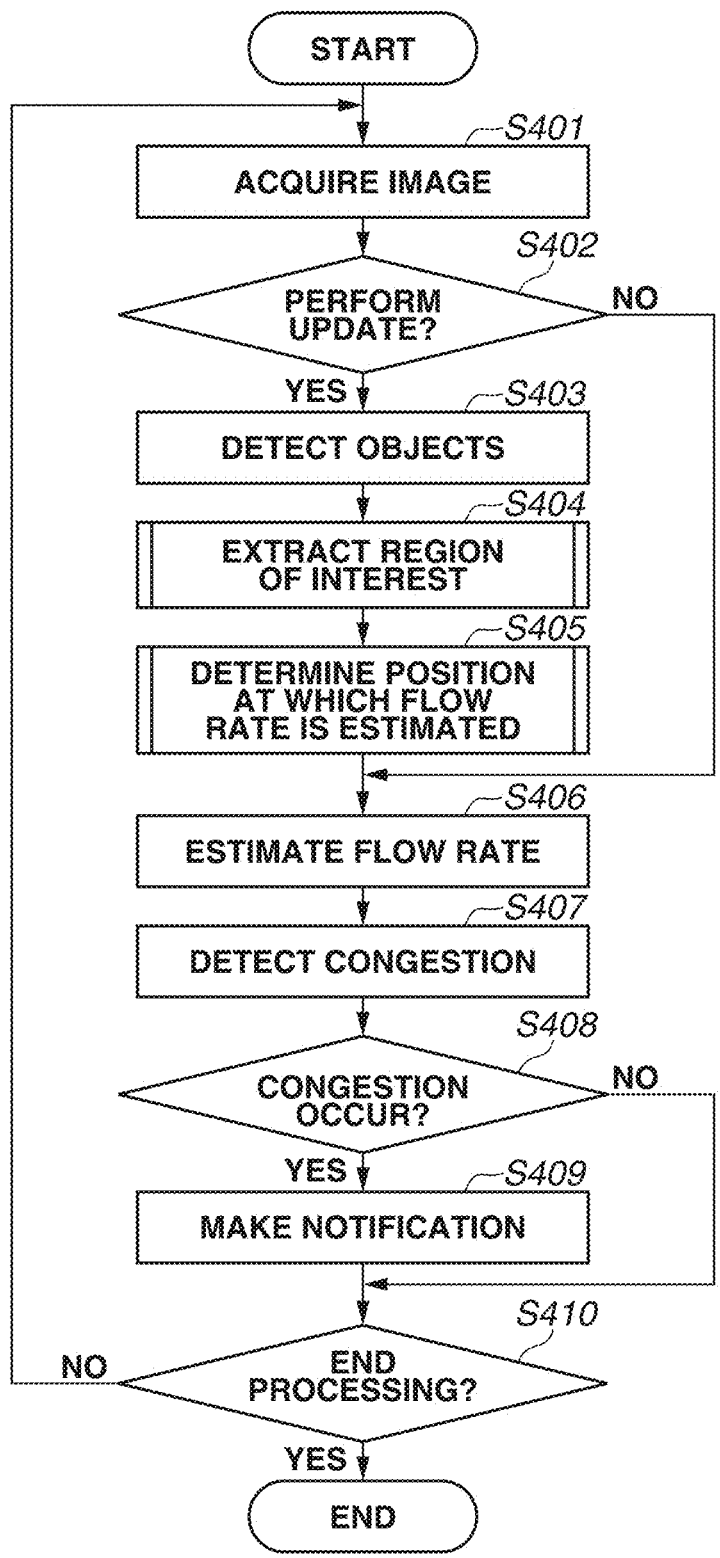
FIG. 5 is a flowchart illustrating procedures of processing executed by the information processing apparatus.

Subsequently, a description will be given of the processing flow for implementing the operations described above with reference to FIG. 5. FIG. 5 is a flowchart illustrating processing executed by the information processing apparatus. The processing described in the flowchart in FIG. 5 is executed by the CPU 1501, which is a computer, in accordance with a computer program stored in the storage apparatus 1504.

First, an overview of the processing executed by the information processing apparatus 102 will be described. In step S401, the acquisition unit 201 acquires an image of a predetermined region, which is captured by the imaging apparatus 101. In step S402, the extraction unit 202 determines whether to update a position at which the flow rate estimation is performed for the image acquired in step S401. In step S402, in a case where the processing of estimating the number of people has been completed for the image input to the extraction unit 202 at a point in time before the present point in time (YES in step S402), the processing proceeds to step S403. In a case where the processing of estimating the number of people has not been completed for the image input to the extraction unit 202 at the point in time before the present point in time (NO in step S402), the processing proceeds to step S406. In step S403, the extraction unit 202 detects objects in the acquired image. In step S404, the extraction unit 202 extracts a region of interest including a larger number of objects based on the positions of the detected objects. In step S404, the extraction unit 202 executes processing from step S4041 to S4043 to narrow down regions in which the flow rate estimation is performed in the image at the present point in time. In step S4041, the extraction unit 202 acquires the positions of the objects in the image. In step S4042, the extraction unit 202 acquires the position of each object in a real space based on the position of each object in the image. In step S4043, the extraction unit 202 extracts the region of interest including more objects out of partial regions each including a plurality of objects, based on the positions of the objects in the real space. In step S405, the determination unit 203 determines a boundary at which movements of objects are estimated, based on the region of interest estimated by the extraction unit 202. In step S4051 of step S405, the determination unit 203 acquires the position of the region of interest in the image. In step S4052, the determination unit 203 acquires the position of an obstacle in the image. In step S4053, the determination unit 203 determines a position at which the flow rate of objects is estimated based on the position of the region of interest. Subsequently, in step S406, the congestion detection unit 205 detects whether there is a region where a density of objects is equal to or higher than a threshold in the region of interest, based on the flow rate of the objects estimated at the determined position. In step S407, the congestion detection unit 205 detects whether there is, in proximity to the region of interest, a region where a density of objects is equal to or higher than a threshold, based on the flow rate of the objects. In step S408, in a case where it is determined that the density of the objects is equal to or higher than the threshold in the region of interest, the congestion detection unit 205 notifies a user of the occurrence of congestion. In a case where the congestion detection unit 205 detects the occurrence of abnormal congestion (YES in step S408), the processing proceeds to step S409. In step S409, in a case where the number of the objects is equal to or greater than the threshold in the region of interest, the congestion detection unit 205 notifies the user of the occurrence of congestion. Specifically, the congestion detection unit 205 displays notification of the occurrence of abnormal congestion on the information terminal 104. The congestion detection unit 205 makes the notification by generating an alarm sound, or highlighting a site where abnormal congestion occurs. Then the processing proceeds to step S410. In a case where the congestion detection unit 205 detects that the density of objects is not equal to or higher than the threshold (NO in step S408), the processing proceeds to step S410. In step S410, the information processing apparatus 102 determines whether to terminate the processing. The description has been given of the overview of the processing performed by the information processing apparatus 102.

In step S401, the acquisition unit 201 acquires the image of the predetermined region, which is captured by the imaging apparatus 101. In this processing, the acquisition unit 201 acquires the image captured by the imaging unit 200. Subsequently, in step S402, the extraction unit 202 determines whether to update the boundary at which the movements of objects are estimated, with respect to the image acquired in step S401. In a case where the processing of estimating the number of people has been completed for a previous frame image input to the extraction unit 202 (YES in step S402), the processing proceeds to step S403. In a case where the processing of estimating the number of people has not been completed for the image input to the extraction unit 202 the last time (NO in step S402), the processing proceeds to step S406. Alternatively, another determination criterion may be used. For example, the information processing apparatus 102 may detect whether to perform the processing of estimating the number of people based on a time of capturing the image. For example, in a case where some event is held at the periphery of a monitoring region, the information processing apparatus 102 may perform the processing of estimating the number of people and update the detection line in synchronization with a start time or end time of the event to adapt to a change in motion of the crowd. This means that the information processing apparatus 102 executes the processing of estimating the number of people on part of the acquired images, and executes the flow rate estimation on all of the images. This is because a processing load of the processing of estimating the number of people and that of the processing of estimating the flow rate are different, as illustrated in FIG. 10. Performing the processing of estimating the number of people on all of the images acquired from the imaging apparatus 101 imposes a high process load. In contrast, performing the processing of estimating the flow rate imposes a lower load than that of the processing of estimating the number of people. Specifically, assume that the processing of estimating the number of people takes ten seconds per frame image while the processing of estimating the flow rate takes one second per frame image. Hence, performing the processing of estimating the number of people, which imposes a high processing load, on every frame, may lower a frequency of performing the processing of estimating the number of people, that is, a frequency of detecting congestion. Thus, in this step, the information processing apparatus 102 performs the processing of estimating the flow rate, while reducing the number of times to perform the processing of estimating the number of people, and analyzes the motion of the crowd as needed, and can thereby effectively notify the user of the occurrence of abnormal congestion from a transition of the congestion.

Figure 6A:
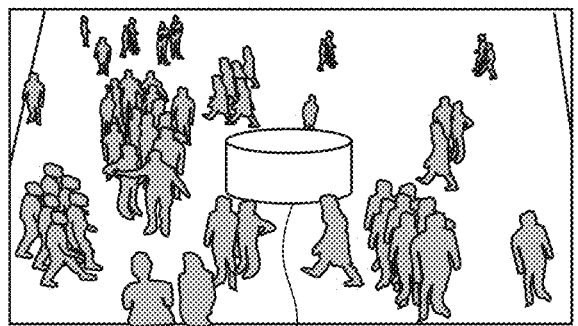
FIG. 6A is a diagram illustrating an example of processing of extracting a region of interest.

In step S403, the extraction unit 202 detects the positions of the objects in the acquired image. Specifically, the extraction unit 202 performs the object detection (detection of the heads of human figures in this case) for the entire image, and detects the respective positions of the objects in the image as a distribution of the objects. In a case where the image is captured by a camera from a high viewpoint to monitor a region such as an open space, the heads of the human figures are unlikely to be blocked by other objects. Thus, the information processing apparatus 102 detects the shapes of the heads of the human figures to detect the human figures. The installation position of the camera or the parts or features detected may be changed depending on the target objects. Specifically, the information processing apparatus 102 detects the positions of the heads of the humans for the acquired image using a known object detection method, such as the technique of Ren et. al, to determine the positions and number of the human figures in the image (Ren, Shaoqing, et. al. "Faster r-cnn: Towards real-time object detection with region proposal networks" 2015). Alternatively, the information processing apparatus 102 may use, for example, a method of extracting features of a human face, or a method of extracting features of a face or a human body from a video using a trained model (neural network). In a case of using the trained model, for example, multitudes of pieces of training data labelled with ground truth (GT) at the positions of human heads on freely-selected images are prepared. Performing a supervised learning method or the like can train the model with parameters. The positions of the objects detected from the image like the image illustrated in FIG. 6A are indicated as the image in FIG. 6B. Black dots in FIG. 6B indicate the positions of the heads of the human bodies, and an impassable region due to an obstacle 601 is indicated as an obstacle position 602.

Figure 16:
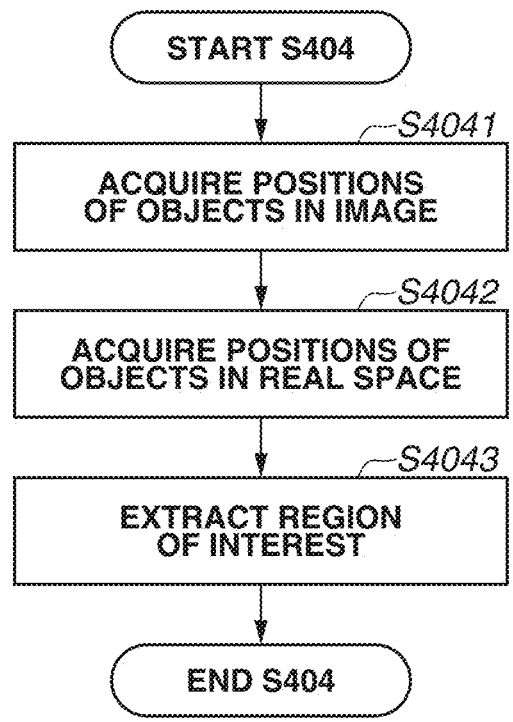
FIG. 16 is a flowchart illustrating procedures of processing executed by an extraction unit.

Subsequently, in step S404, the extraction unit 202 extracts the region of interest including a larger number of objects based on the respective positions of the objects in the real space. The processing in step S404 will be described with reference to a flowchart illustrated in FIG. 16. First, an overview of the processing will be described. In step S4041, the extraction unit 202 acquires the positions of the objects in the image. In step S4042, the extraction unit 202 acquires the positions of the objects in the real space based on the positions of the objects in the image. In step S4043, the extraction unit 202 extracts the region of interest including more objects than those in the other regions, based on the positions of the objects in the real space.

Figure 6B:
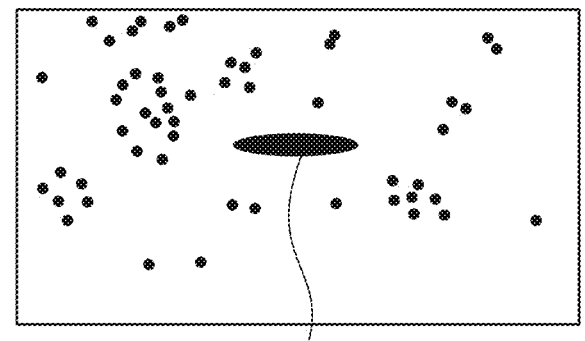
FIG. 6B is a diagram illustrating an example of the processing of extracting the region of interest.

In step S4041, the extraction unit 202 acquires the positions of the objects in the image. A description will be given with reference to FIGS. 6A to 6D. FIG. 6A illustrates an example of the image as the processing target in step S401. FIG. 6B illustrates results of performing the object detection for this processing target in step S403 and estimating the positions of the heads of the human figures. Black dots in FIG. 6B indicate respective positions of the heads of the human figures. A position at which a human figure does not appear in the image due to the presence of the known obstacle 601 is predesignated as the obstacle position 602 at the time of installation of the camera. Typically, a position at which a ground contact surface of the obstacle 601 is lifted to a height of the head of a standard human figure is set as the obstacle position 602 assuming that the head does not appear at this position. The obstacle position 602 may be determined based on terrain information of a predetermined installation position. Alternatively, the information processing apparatus 102 may perform object recognition on the video and automatically set a position at which a fixed object is detected as the obstacle position 602.

Figure 6C:
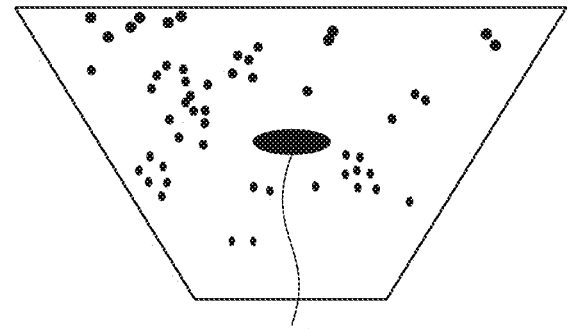
FIG. 6C is a diagram illustrating an example of the processing of extracting the region of interest.

In step S4042, the extraction unit 202 identifies the positions of the objects in the real space based on the positions of the objects detected from the image and known intrinsic parameters. Specifically, the extraction unit 202 performs projection transformation on the result of the object detection based on settings (known intrinsic parameters) regarding the height of the camera 101 at the installation area and orientation information indicating pan, tilt, and zoom operations of the camera 101, and obtains locations of the human figures (a plot on a map) when viewed from directly above. FIG. 6C illustrates a result of transforming the image of FIG. 6B. The extraction unit 202 performs similar transformation on the obstacle position 602 to result in an obstacle 603. This transformation is intended to make correction because an actual distance between humans does not match an apparent distance in the video between the near and far sides of a camera video. In this step, the extraction unit 202 makes correction by performing the projection transformation. However, in a case of a video having specific distortion with the usage of a wide-angle lens or a fish-eye lens, the extraction unit 202 makes correction by performing geometric transformation in accordance with characteristics of the lens.

In step S4043, the extraction unit 202 extracts the region of interest including more objects than those in the other regions (having a higher congestion level), based on the positions of the objects in the real space. Alternatively, the extraction unit 202 may extract a region having a congestion level (the number of objects per region) that is higher than a predetermined threshold (first threshold) as the region of interest. Assuming that a point set corresponding to positional coordinates of the human figures is a sample generated based on one of probability distribution families (Gaussian Mixture Models (GMMs) in this case), the extraction unit 202 selects a probability distribution that is considered to be the most probable. This probability distribution indicates a density distribution (congestion level) of the target objects. That is, the extraction unit 202 determines a parameter of the probability distribution. The locations of the human figures are associated with a predetermined probability distribution to estimate a congestion level. Here, a method of applying a two-dimensional GMM by using an expectation-maximization (EM) algorithm is employed as a publicly-known method. The extraction unit 202 searches for and determines a mixture number that produces the lowest Akaike's Information Criterion (AIC) value. A congestion level $C(x)$ at a position x after correction (a two dimensional vector) is represented by the following Expression (1).

$$C(x) = \sum_{i=1}^{M} w_i N_i(x) \quad (1)$$
$$\left(\sum_{i=1}^{M} w_i = N\right)$$

M represents the mixture number of the GMM, wi represents a mixture weight, and Ni represents a normal distribution. Assume that an average of Ni is μi, a variance-covariance matrix is Σi, and σi=√|det(Σi)| (det is a determinant). In addition, N represents a total number of human figures detected in step S402. Since N is obtained by integrating $C(x)$ with respect to the entire image, $C(x)$ represents continuous densities of human figures. That is, M represents the number of groups in the image, wi represents the number of people in the group, wiNi(x) represents a peak position of a group i, and σi represents a determinant of Σi. Thus, σi serves as an index substantially representing a range of a distribution of the group i. As a value of i becomes smaller, the range of the distribution becomes smaller, and more people are concentrated near the center.

Figure 6D:
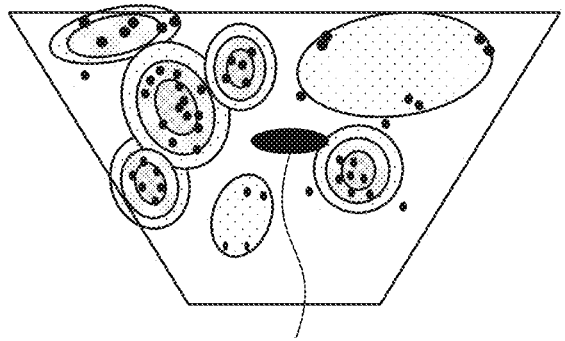
FIG. 6D is a diagram illustrating an example of the processing of extracting the region of interest.

FIG. 6D illustrates a result of obtaining the congestion level with respect to the locations of the human figures illustrated in FIG. 6C. FIG. 6D schematically illustrates that a GMM having a mixture number M of 7 is estimated, and each normal distribution Ni represents the peak of the congestion level substantially corresponding to the congestion state of the group of the human figures. A density of a solid portion in FIG. 6D indicates a range of the probability distribution (a higher density indicates a wider range, and white indicates that the probability distribution has almost no range). The range of the probability distribution may be indicated in color. The average μi of the normal distribution represents the position (after correction) of the group, and the variance-covariance matrix Σi represents a range and orientation of the group. That is, a larger value of $C(x)$ at the point x indicates a higher density and a higher congestion level. After step S403, the processing proceeds to step S404.

In the flow of the object detection between steps S403 and S405, the object detection or the like is implemented for the entire video frame, which requires a large amount of calculation and processing time. For example, one round of the processing takes about ten seconds. In the flow of the flow rate estimation (from steps S406 to S407), which will be subsequently described, the information processing apparatus 102 operates at a relatively high speed, for example, by executing processing every frame of a video at 10 fps. Hence, the information processing apparatus 102 may perform the object detection for frames acquired at a predetermined interval, while performing the flow rate estimation for all of the frames. The information processing apparatus 102 performs the flow rate estimation for frames on which the object detection is not performed, using the detection line determined in the previous object detection processing. A description will be given of processing in such a case in the present exemplary embodiment.

Figure 17:
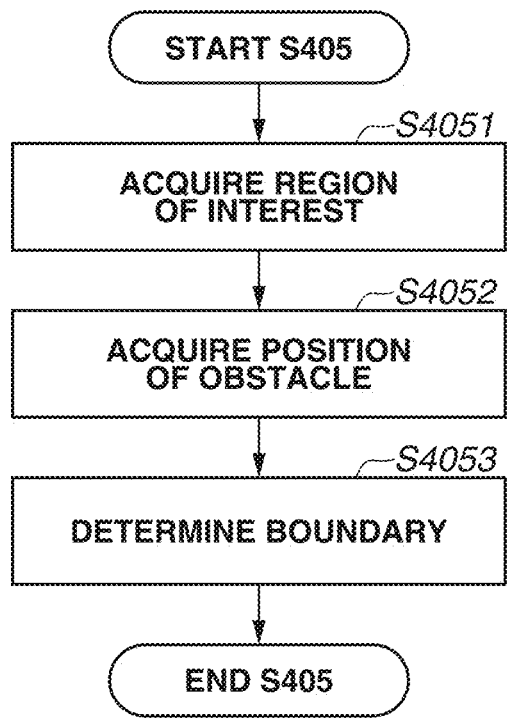
FIG. 17 is a flowchart illustrating procedures of processing executed by a determination unit.

In step S405, the determination unit 203 determines the boundary at which the movements of the objects are estimated, based on the extracted region of interest. That is, the determination unit 203 determines the boundary at which the estimation is made of the number of people moving from the region of interest where people, the number of which is larger than a predetermined number of people, have gathered. A method of determining the boundary at which the movements of the objects are estimated will now be described using a flowchart illustrated in FIG. 17. An overview of the processing in step S405 is first described. In step S4051, the determination unit 203 acquires the position of the extracted region of interest in the image. In step S4052, the determination unit 203 acquires the position of the obstacle in the image. In step S4053, the determination unit 203 determines a position at which the flow rate of the objects is estimated based on the position of the region of interest. In a case where there is an obstacle or impassable region in proximity to the region of interest, the determination unit 203 determines the position at which the flow rate of objects is estimated, based on the position of the impassable region.

Figure 7A:
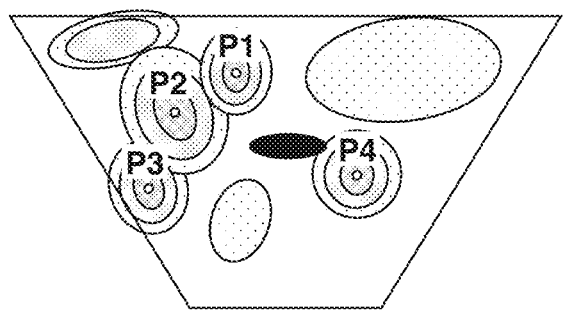
FIG. 7A is a diagram illustrating an example of a flow rate estimation position.

In step S4051, the determination unit 203 acquires the position of the region of interest in the image. FIG. 7A illustrates an example of the congestion level estimated in step S403. First, the determination unit 203 calculates di=wi/σi to obtain each mixture distribution of C(x), and selects a mixture distribution that exceeds a predetermined threshold, for example, 5. In this expression, wi represents the number of people included in the distribution expressed by the term of Ni, and σi is the index representing the range of the distribution. Thus, a value of di becomes higher as more people are included and the range of the distribution becomes smaller. This means that a higher value of di indicates that people are concentrated in a narrower range, that is, a region in proximity to the boundary has a high density of people and is congested. In FIG. 7A, four normal distributions, the centers of which are indicated by white circles, that is, regions of interest, are selected. Here, i=1, 2, 3, and 4, and dots at the centers (=μi) of the regions of interest are P1, P2, P3, and P4, respectively. The position of each region of interest is not necessarily the center, and may be the centroid of the region or a position of a freely-selected object in the region. A method of selecting a mixture distribution is not limited to the above-mentioned method of using di as the index, and may be, for example, a method of calculating a distance between a human figure in proximity to pi and another human figure that is the nearest to the human figure, and using a minimum value or average value of distances as an index. In addition, an increase rate of the number of people that can be considered to belong to an identical group may be used as an index. The increase rate is calculated by a method of associating a term of a congestion level calculated immediately before and a term of a current congestion level with each other using a method such as a Hungarian matching with a distance between the respective centers of normal distributions being a cost, and seeking a difference in wi between the corresponding terms. A mixture distribution may be selected by combining these indexes.

Figure 7B:
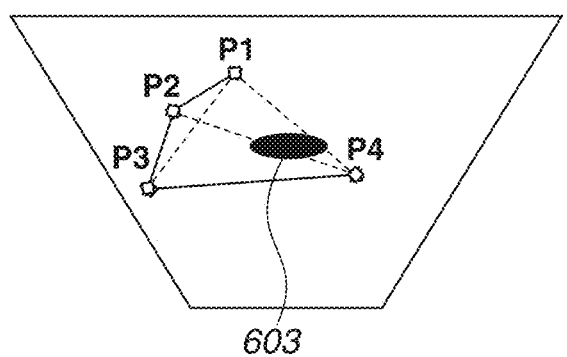
FIG. 7B is a diagram illustrating an example of the flow rate estimation position.

Subsequently, in step S4052, the determination unit 203 acquires the position of the obstacle in the image. A user preliminarily grasps the obstacle through which a human figure is unable to pass in the monitoring region, and causes the holding unit 206 to store the position of the obstacle in the image. The determination unit 203 can select a line segment not including the position of the known obstacle out of line segments each connecting partial regions each including a plurality of objects, based on the position of the obstacle acquired from the holding unit 206. This processing is now described using an example illustrated in FIG. 7B. First, a straight line connecting P1 and P4 overlaps the obstacle 603. That is, the information processing apparatus 102 can judge that there is no flowing from P1 to P4 and vice versa, and thus does not estimate the flow rate between P1 and P4. The same applies to the straight line between P2 and P4. Subsequently, a straight line connecting P1 and P3 passes near P2. That is, since the flow rate from P1 to P3 is difficult to be distinguished from the flow rate from P1 to P2 and the flow rate from P2 to P3, the information processing apparatus 102 substitutes measurement of the flow rate from P1 to P2 and the flow rate from P2 to P3 for the estimation of the flow rate from P1 to P3, instead of estimating the flow rate from P1 to P3. The information processing apparatus 102 estimates an angle P1P2P3, and determines that a case where an angle exceeds 165 degrees corresponds to the above case. Alternatively, the information processing apparatus 102 may make determination based on whether a foot of a perpendicular line extending from P2 to the straight line passing through P1 and P3 is included in an ellipse corresponding to a 2σ range of the distribution of P2. Consequently, the information processing apparatus 102 determines to estimate the flow rate between P1 and P2, the flow rate between P2 and P3, and the flow rate between P3 and P4 in the example illustrated in FIG. 7B.

Figure 7C:
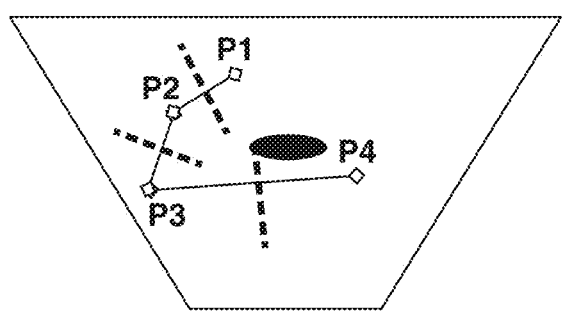
FIG. 7C is a diagram illustrating an example of the flow rate estimation position.
Figure 7D:
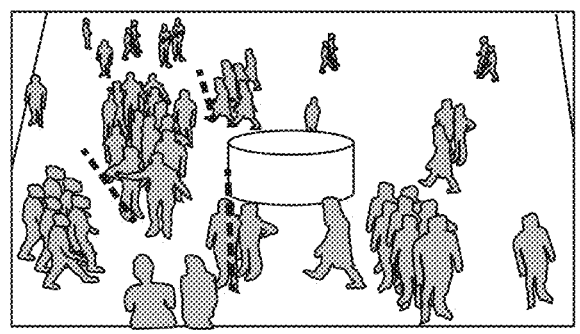
FIG. 7D is a diagram illustrating an example of the flow rate estimation position.

Next, in step S4053, the determination unit 203 determines a line segment connecting regions of interests each including objects, the number of which is larger than a first threshold, out of partial regions each including a plurality of objects, as the boundary at which the movements of objects are estimated. In a case where there is an obstacle or an impassable region in proximity to the region of interest, the determination unit 203 determines the boundary at which the movements of the objects are estimated, based on the position that is made impassable due to the presence of the obstacle, as described above. Since the flow rate estimation unit 204 estimates the number of people who have passed the detection line set in the video as described below, the determination unit 203 determines the boundary between the regions of interest each including objects, the number of which is larger than the first threshold, as the detection line. The detection line is set at a middle position between peaks of congestion. In the example illustrated in FIG. 7C, the determination unit 203 sets detection lines as a perpendicular bisector between P1 and P2, a perpendicular bisector between P2 and P3, and a perpendicular bisector between P3 and P4, as indicated by dotted lines.

In view of reducing a processing load, the determination unit 203 predetermines a total length L of the detection lines that can be set (length after correction) to be smaller than a predetermined length, at the time of installation of the imaging apparatus 101. Since a higher value of L requires longer calculation time for the flow rate estimation, the determination unit 203 sets a maximum value of calculation time that falls within an imaging frame interval of the imaging unit 200 based on a calculation capability of the information processing apparatus 102. The determination unit 203 allocates the respective lengths of the detection lines at the respective estimation positions sought in the previous processing so that a total of the lengths becomes L, and thereafter sets actual detection lines. In this example, a length of L/3 is allocated to each of the middle position between P1 and P2, the middle position between P2 and P3, and the middle position between P3 and P4. Assume that a portion corresponding to a length of L/3 of a perpendicular bisector with an intersection point between a straight line connecting corresponding regions in interest and the perpendicular bisector being the center is the detection line. In a case where the detection line interferes with the position of the obstacle like the detection line between P3 and P4, the determination unit 203 cuts down one side of the detection line where there is the obstacle. In this manner, the determination unit 203 reduces a processing load by reducing the length of the detection line, and can thereby effectively predict the occurrence of congestion.

Finally, the determination unit 203 performs inverse transformation of projection transformation performed in step S403 with respect to the detection line determined in this manner to determine the detection line as a detection position in the acquired image. The flow rate estimation unit 204 performs the flow rate estimation, which will be described below, using this detection line. The holding unit 206 holds information about the object detection, the congestion level, and the position of the flow rate estimation, which have been acquired in the processing between steps S402 and S404, as the latest result.

Figure 8A:
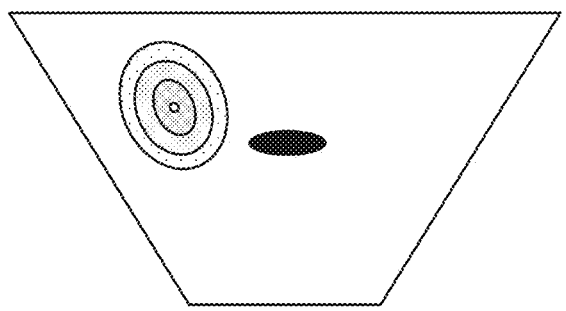
FIG. 8A is a diagram illustrating an example of a flow rate estimation position.
Figure 8B:
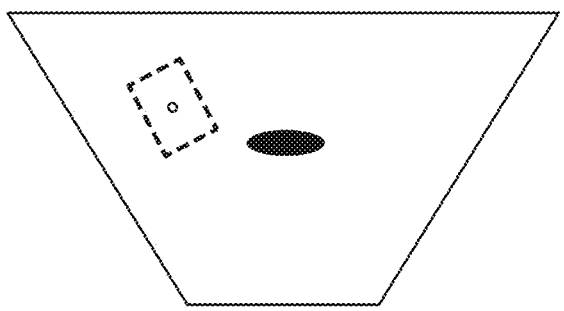
FIG. 8B is a diagram illustrating an example of the flow rate estimation position.
Figure 9:
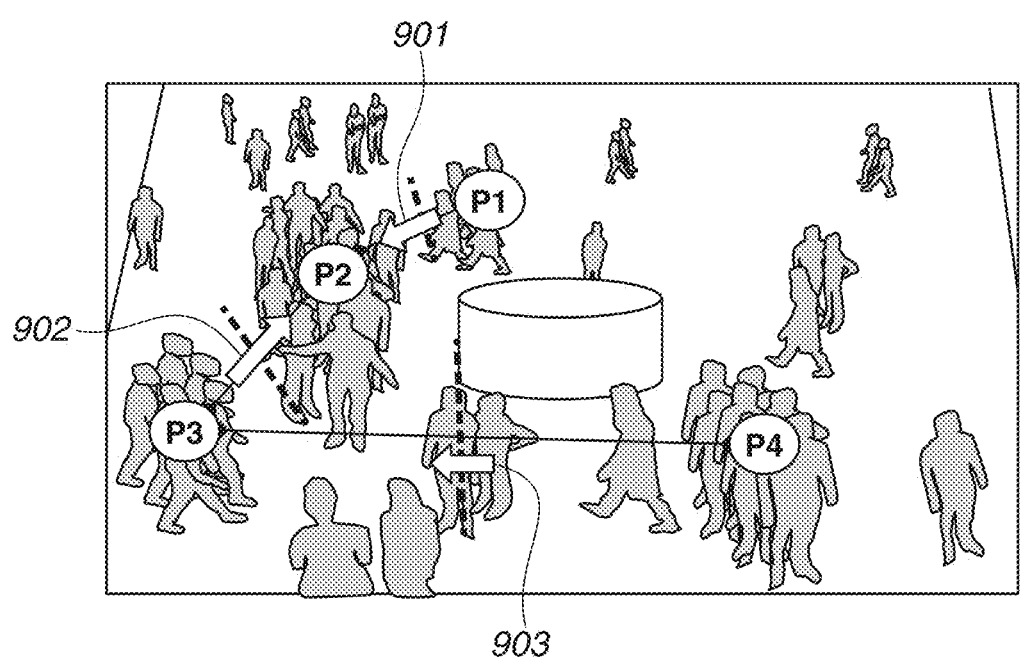
FIG. 9 is a diagram illustrating an example of an image as a processing target.
Figure 11A:
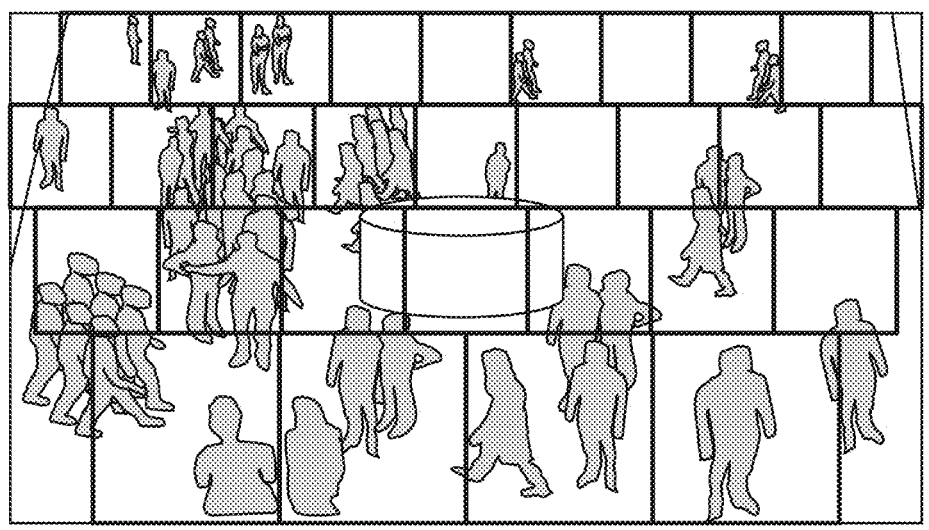
FIG. 11A is a diagram illustrating an example of an image as a processing target.
Figure 11B:
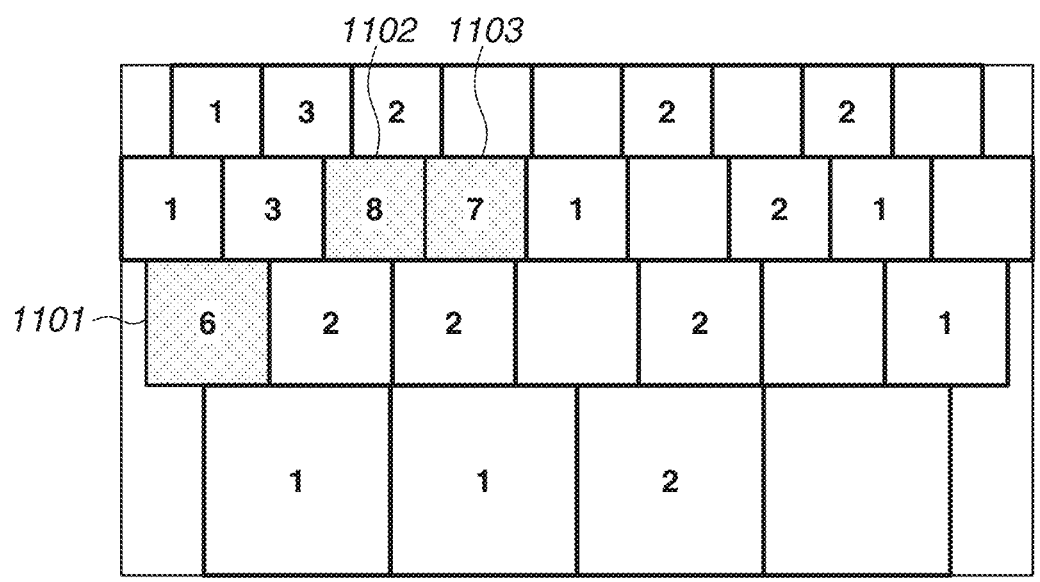
FIG. 11B is a diagram illustrating an example of the image as the processing target.
Figure 12B:
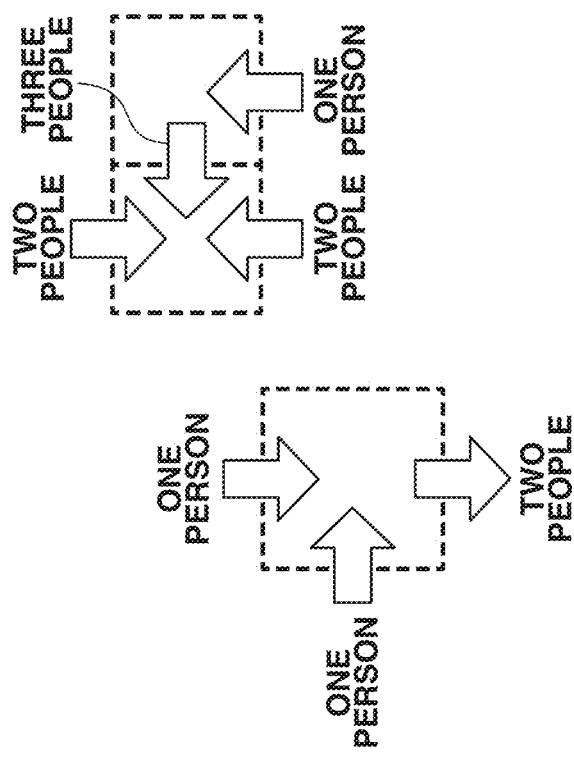
FIG. 12B is a diagram illustrating an example of the flow rate estimation position.
Figure 12A:
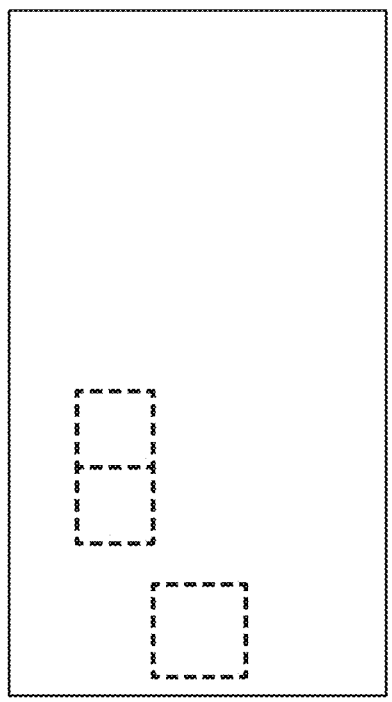
FIG. 12A is a diagram illustrating an example of a flow rate estimation position.
Figure 12C:
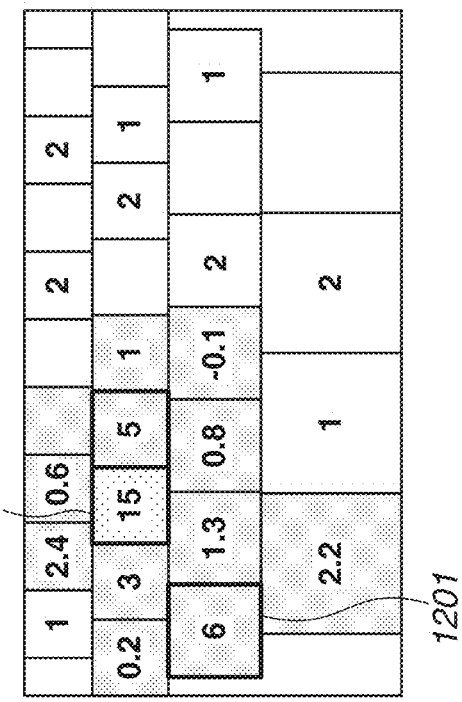
FIG. 12C is a diagram illustrating an example of the flow rate estimation position.
Figure 14A:
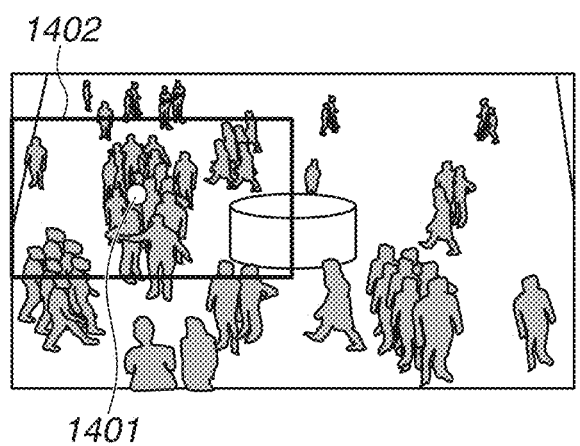
FIG. 14A is a diagram illustrating an example of a processing result.
Figure 14B:
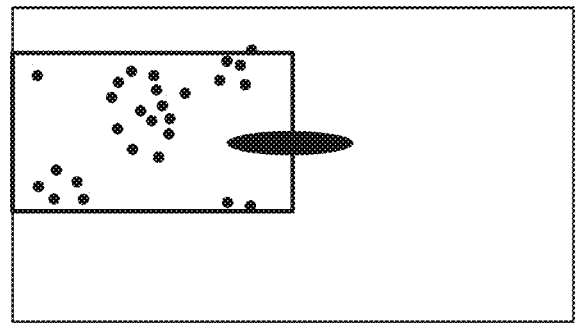
FIG. 14B is a diagram illustrating an example of the processing result.
Figure 15:
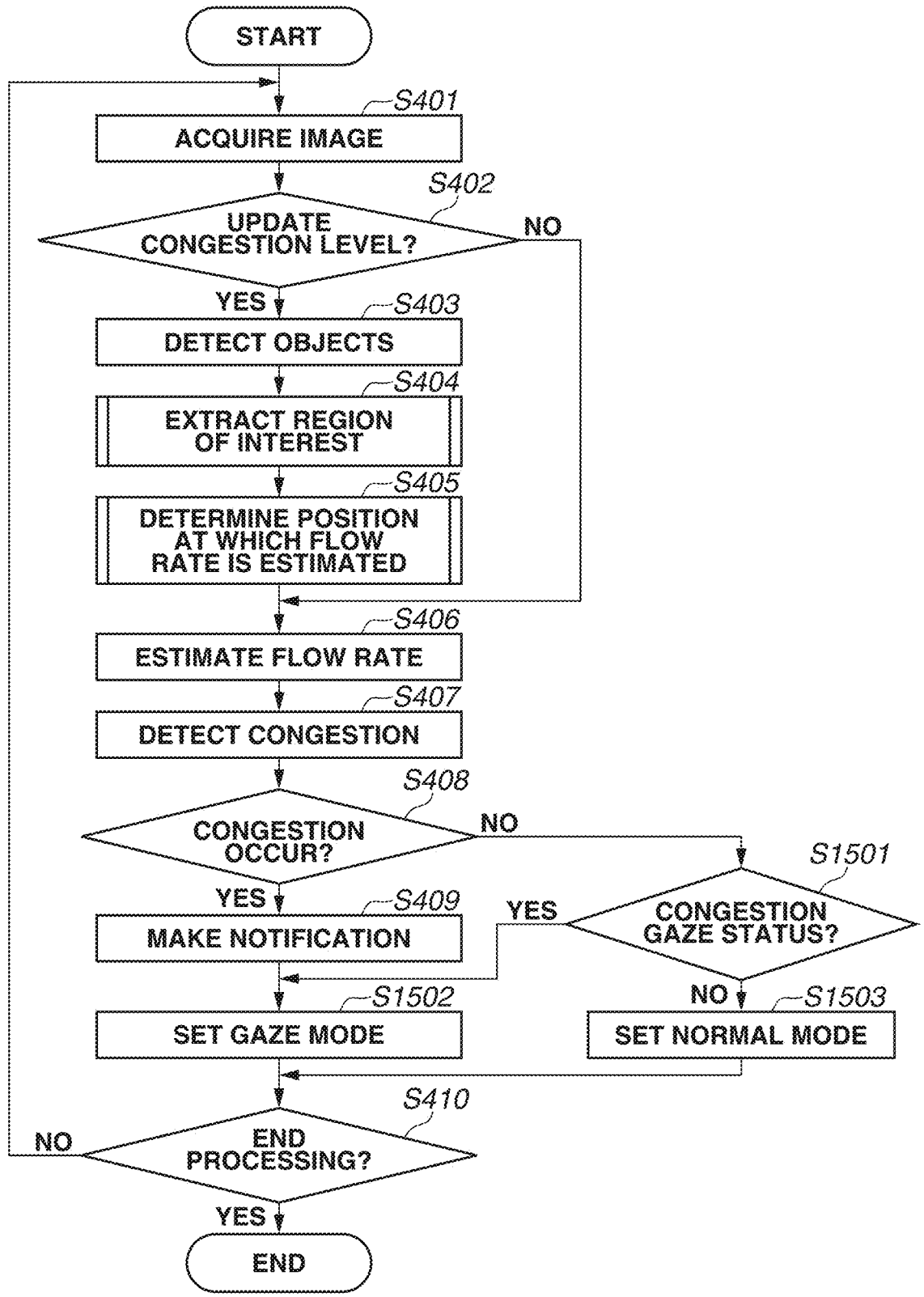
FIG. 15 is a flowchart illustrating procedures of processing executed by the information processing apparatus.

In a case where there is only one region of interest as illustrated in FIG. 8A, the determination unit 203 determines the detection line so as to surround the region of interest as illustrated in FIG. 8B. For example, the determination unit 203 determines the detection line as a rectangle circumscribing an ellipse corresponding to a 2σ range of the normal distribution. With this configuration, the information processing apparatus 102 can detect an inflow and outflow to and from the region of interest. A case of setting the detection line surrounding the region of interest is not limited to the case where there is only one region of interest. For example, a region of interest which is isolated by an obstacle may be surrounded by the detection line, and to give another example, a region of interest that can be considered to be the most congested region may be surrounded by the detection line. In addition, the detection line is not limited to the straight line, and may be a curved line. For example, the detection line surrounding the region of interest is not limited to the rectangle, and may be, for example, a complex figure that circumvents the obstacle, in addition to a precise circle or an ellipse, and the shape is not specifically limited.

To allocate a total length of the detection lines, the determination unit 203 divides the total length equally, but may also employ a method of allocating the total length in accordance with a level of congestion. The determination unit 203 allocates the total length in proportion to a value of di at the peak of congestion, and can thereby allocate more calculation resources for the flow rate estimation to a site having a higher congestion level. Alternatively, the determination unit 203 may select regions of interest in descending order of congestion levels, instead of using the threshold to secure a minimum length of the detection line. After step S405, the processing proceeds to step S406.

In step S406, the flow rate estimation unit 204 first estimates the flow rate of objects, based on the determined position. The flow rate estimation unit 204 first performs the object detection in proximity to the detection line to perform the flow rate estimation. Then, the flow rate estimation unit 204 associates an object detected from the current image with an object detected from the last image. For example, the flow rate estimation unit 204 searches for a feature of a human figure detected in the previous frame in proximity to the position at which the flow rate is estimated, and thereby detects the position of the human figure to be collated (tracking processing). Subsequently, the flow rate estimation unit 204 acquires, for the object whose association between the successive images have been detected, a motion vector of the object based on the position of the object detected in the previous frame and the position of the object detected from the current image. This motion vector is referred to as a traffic line. The flow rate estimation unit 204 then detects whether the traffic line acquired from the corresponding objects has crossed the determined detection line, and counts the number of objects that have crossed the detection line. The tracking processing is accurate because a human figure that has crossed the detection line is directly detected, but needs to secure a frame rate of the video, which is the processing target. In the present exemplary embodiment, the information processing apparatus 102 restricts the processing of estimating the flow rate to a region in proximity to the detection line, and can thereby process a video at a high frame rate with a reduced amount of calculation.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-123795, filed Jul. 20, 2020, which is hereby incorporated by reference herein in its entirety.

What is claimed is:

1. An information processing apparatus that detects an object from an image, comprising:
   one or more processors; and
   one or more memories storing one or more programs configured to be executed by the one or more processors, the one or more programs including instructions to:
   determine a boundary at which a movement of the object between partial regions in the image is estimated, the partial regions being specified based on positions of a plurality of objects; and
   estimate movement information indicating a number of objects that have passed the determined boundary,
   wherein the boundary at which the movement of the object is estimated is determined based on a partial image out of a plurality of partial images obtained by dividing the image including objects, a number of which is larger than a predetermined value.

2. The information processing apparatus according to claim 1, wherein the one or more programs include further instructions to detect a congestion region including more objects than other partial regions based on the estimated movement information.

3. The information processing apparatus according to claim 2, wherein, in a case where a density of objects in proximity to the boundary is higher than a predetermined threshold, the congestion region is detected.

4. The information processing apparatus according to claim 2, wherein, in a case where a number of objects in a region in proximity to the boundary is larger than a predetermined threshold, the congestion region is detected.

5. The information processing apparatus according to claim 2, wherein, in a case where a total of the number of objects that have passed the determined boundary and have flowed into a region of interest and a number of objects detected from the image is larger than a second threshold indicating a congestion state, the congestion region is detected.

6. The information processing apparatus according to claim 2, wherein the one or more programs include further instructions to notify a user of occurrence of a congestion state in a case where the congestion region is detected.

7. The information processing apparatus according to claim 2, wherein, in a case where the number of objects is larger than a predetermined value, the congestion region is detected based on the estimated movement information.

8. The information processing apparatus according to claim 1, wherein the boundary at which the movement of the object is estimated is determined based on a partial region out of the partial regions, the partial region including objects in the image, a number of which per region is larger than that of the other partial regions.

9. The information processing apparatus according to claim 1, wherein the boundary at which the movement of the object is estimated is determined based on a partial region out of the partial regions, the partial region including objects in the image, a number of which per region is larger than a first threshold.

10. The information processing apparatus according to claim 1, wherein the one or more programs include further instructions to extract partial regions each including a plurality of objects, based on a position of the object in the image,
wherein the boundary at which the movement of the object is estimated is determined based on a region of interest out of the extracted partial regions, the region of interest including objects, a number of which is larger than that of the other regions.

11. The information processing apparatus according to claim 10, wherein the partial regions are extracted based on a position of the object in a real space, the object being detected from the image.

12. The information processing apparatus according to claim 1, wherein a line segment connecting two regions acquired from the partial regions is determined as the boundary at which the movement of the object is estimated.

13. The information processing apparatus according to claim 12, wherein a line segment not including a position of a known obstacle out of line segments each connecting two regions acquired from the partial regions is determined as the boundary at which the movement of the object is estimated.

14. The information processing apparatus according to claim 12, wherein a line segment connecting regions of interest out of the partial regions, each region of interest including objects, a number of which is larger than a first threshold, is determined as the boundary at which the movement of the object is estimated.

15. The information processing apparatus according to claim 12, wherein the line segment connecting the two regions acquired from the partial regions is determined as the boundary at which the movement of the object is estimated such that a length of the line segment is smaller than a predetermined length.

16. The information processing apparatus according to claim 1, wherein the movement of the object is estimated by tracking a feature of the object in proximity to the determined boundary.

17. The information processing apparatus according to claim 1, wherein the one or more programs include further instructions to:
identify, in a case where a number of objects in a partial region constituting the image is larger than a first threshold indicating a small-scale congestion state and is larger than a second threshold indicating an abnormal congestion state, the partial region as a region of interest; and
hold a number of objects in the region of interest by detecting a feature of each object from the region of interest,
wherein, in a case where the region of interest is identified, whether the number of objects in the region of interest is larger than a predetermined threshold is detected, and
wherein, in a case where the number of objects in the region of interest is smaller than the second threshold, the region of interest is canceled.

18. A non-transitory computer readable storage medium that stores a program that causes a computer to execute an information processing method of detecting an object from an image, the method comprising:
determining a boundary at which a movement of the object between partial regions in the image is estimated, the partial regions being specified based on positions of a plurality of objects; and
estimating movement information indicating a number of objects that have passed the determined boundary,
wherein the boundary at which the movement of the object is estimated is determined based on a partial image out of a plurality of partial images obtained by dividing the image including objects, a number of which is larger than a predetermined value.

19. An information processing method for detecting an object from an image, the method comprising:
determining a boundary at which a movement of the object between partial regions in the image is estimated, the partial regions being specified based on positions of a plurality of objects; and
estimating movement information indicating a number of objects that have passed the determined boundary,
wherein the boundary at which the movement of the object is estimated is determined based on a partial image out of a plurality of partial images obtained by dividing the image including objects, a number of which is larger than a predetermined value.

* * * * *